US009860408B2

(12) United States Patent
Kubokura (10) Patent No.: US 9,860,408 B2
(45) Date of Patent: Jan. 2, 2018

(54) INFORMATION PROCESSING SYSTEM, INFORMATION PROCESSING METHOD, AND COMPUTER PROGRAM PRODUCT

(71) Applicant: Masatoshi Kubokura, Kanagawa (JP)

(72) Inventor: Masatoshi Kubokura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/374,192

(22) Filed: Dec. 9, 2016

(65) Prior Publication Data

US 2017/0171415 A1 Jun. 15, 2017

(30) Foreign Application Priority Data

Dec. 11, 2015 (JP) .................................. 2015-242731

(51) Int. Cl.
*H04N 1/04* (2006.01)
*H04N 1/00* (2006.01)
*H04N 1/32* (2006.01)

(52) U.S. Cl.
CPC ..... *H04N 1/00973* (2013.01); *H04N 1/00204* (2013.01); *H04N 1/00938* (2013.01); *H04N 1/32117* (2013.01); *H04N 2201/0094* (2013.01); *H04N 2201/3208* (2013.01)

(58) Field of Classification Search
CPC ......... H04N 2201/0094; H04N 1/0097; H04N 2201/3202; G06F 2221/2117; G06F 3/1208; G06F 3/1214; G06F 3/1229; G06F 3/1261; G06F 3/1285; G06F 3/1297; G06F 8/61; G06F 9/30174; G06F 3/1222; G06F 3/1236
USPC ......... 358/1.15, 1.13, 1.9, 468, 474; 399/27, 399/80, 12; 709/221, 223, 227, 228, 230
See application file for complete search history.

(56) References Cited

U.S. PATENT DOCUMENTS

| | | | | |
|---|---|---|---|---|
| 8,035,828 B2* | 10/2011 | Furuya | .................. | G06F 3/1204 358/1.13 |
| 8,286,160 B2* | 10/2012 | Asai | ..................... | G06F 9/44505 717/171 |
| 8,355,146 B2* | 1/2013 | Takechi | ................ | G06F 3/1239 358/1.14 |
| 8,972,996 B2* | 3/2015 | Matsubayashi | ....... | G06F 9/4843 718/100 |
| 2002/0152461 A1* | 10/2002 | Istvan | .................... | H04H 60/40 725/14 |
| 2006/0034630 A1* | 2/2006 | Yabe | ...................... | G03G 15/50 399/82 |
| 2009/0237722 A1 | 9/2009 | Kubokura | | |

(Continued)

FOREIGN PATENT DOCUMENTS

| JP | 2014-229169 | 12/2014 |
|---|---|---|
| JP | 2016-157156 | 9/2016 |
| JP | 2016-157370 | 9/2016 |

*Primary Examiner* — Negussie Worku
(74) *Attorney, Agent, or Firm* — Duft Bornsen & Fettig LLP (57) ABSTRACT

An information processing system includes one or more devices configured to operate based on setting information for controlling an operation; and at least one external device configured to change the setting information of the device. The external device includes circuitry configured to: acquire the setting information of the device, generate change information obtained by changing the acquired setting information, and set the change information in the device. The device includes circuitry configured to: acquire the setting information from a setting storage and transmit the acquired setting information to the external device, acquire the change information in the external device, and rewrite original setting information stored in the setting storage to the acquired change information.

19 Claims, 7 Drawing Sheets

(56) References Cited

U.S. PATENT DOCUMENTS

| | | | |
|---|---|---|---|
| 2010/0265530 A1* | 10/2010 | Takechi | G06F 21/608 358/1.14 |
| 2010/0290801 A1* | 11/2010 | Nosaki | G03G 15/5075 399/85 |
| 2011/0242586 A1* | 10/2011 | Usui | H04N 1/00222 358/1.15 |
| 2012/0268753 A1* | 10/2012 | Tokuda | G06F 3/1204 358/1.2 |
| 2014/0160504 A1* | 6/2014 | Nakashima | H04N 1/00408 358/1.13 |
| 2014/0368857 A1* | 12/2014 | Edamatsu | G06K 15/1806 358/1.13 |
| 2015/0052443 A1* | 2/2015 | Funase | G06F 3/0484 715/736 |
| 2015/0261478 A1* | 9/2015 | Obayashi | H04N 1/00896 358/1.15 |
| 2015/0261482 A1* | 9/2015 | Takano | G06F 3/1205 358/1.15 |
| 2015/0331649 A1* | 11/2015 | Kadota | G06F 3/1292 358/1.13 |
| 2015/0358493 A1* | 12/2015 | Baba | H04N 1/00037 358/1.14 |
| 2016/0006896 A1* | 1/2016 | Kirihata | H04N 1/00498 358/1.13 |
| 2016/0110852 A1* | 4/2016 | Yanai | G06T 5/003 382/264 |
| 2016/0248921 A1 | 8/2016 | Niwa | |
| 2016/0255214 A1 | 9/2016 | Kato | |
| 2017/0019552 A1* | 1/2017 | Nakamura | H04N 1/0097 |
| 2017/0078520 A1* | 3/2017 | Kobayashi | G06F 3/1285 |

* cited by examiner

INFORMATION PROCESSING SYSTEM, INFORMATION PROCESSING METHOD, AND COMPUTER PROGRAM PRODUCT

CROSS-REFERENCE TO RELATED APPLICATIONS

The present application claims priority under 35 U.S.C. §119 to Japanese Patent Application No. 2015-242731, filed Dec. 11, 2015. The contents of which are incorporated herein by reference in their entirety.

BACKGROUND OF THE INVENTION

1. Field of the Invention

The present invention relates to an information processing system, an information processing method, and a computer program product.

2. Description of the Related Art

In recent years, a multifunction peripheral (MFP) having composite functions such as a copy function and a print function includes many functions such as a remaining toner amount display function. However, there are few users using all the functions provided in MFP, and the MFP tends to have an excessive number of functions. Therefore, there may be a case in which manufacturers and sales companies or third venders of MFP develop an application having a simplified function in MFP or an application dedicated to a specific use and install the application in the MFP.

Moreover, applications installed corresponding to functions of the MFP become complicated and enormous. A device administrator or a user selects a required function or application to change settings.

However, it is necessary to change the settings of the MFP manually, and therefore there is a problem requiring time and effort. In addition, when the operation of changing the settings is performed on a plurality of MFPs, there is also a problem requiring time and effort which correspond to the number of units because the operation needs to be performed one by one even if the setting change contents are the same as each other.

SUMMARY OF THE INVENTION

According to an aspect of the present invention, there is provided an information processing system including: one or more devices configured to operate based on setting information for controlling an operation; and at least one external device configured to change the setting information of the device, wherein the external device includes circuitry configured to: acquire the setting information of the device, generate change information obtained by changing the acquired setting information, and set the change information in the device, and the device includes circuitry configured to: acquire the setting information from a setting storage and transmit the acquired setting information to the external device, acquire the change information in the external device, and rewrite original setting information stored in the setting storage to the acquired change information.

According to another aspect of the present invention, there is provided a computer program product for being executed on computer including: acquiring setting information for controlling an operation from a setting storage and transmitting the acquired setting information to an external device, acquiring change information in which the setting information is changed and transmitted in the external device, and rewriting original setting information stored in the setting storage to the acquired change information.

According to still another aspect of the present invention, there is provided an information processing method for an information processing system including one or more devices configured to operate based on setting information for controlling an operation and at least one external device configured to change the setting information of the device, the information processing method including: acquiring, by the external device, the setting information of the device; generating, by the external device, change information obtained by changing the acquired setting information; setting, by the external device, the change information in the device; acquiring, by the device, the setting information from a setting storage and transmitting the acquired setting information to the external device; acquiring, by the device, the change information in the external device; and rewriting, by the device, original setting information stored in the setting storage to the acquired change information.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The present invention has an object to provide an information processing system, a computer program product, and an information processing method capable of more effectively changing the settings and the like.

An information processing system according to exemplary embodiments to which the present invention is applied will be explained in detail below with reference to the accompanying drawings.

Figure 1:
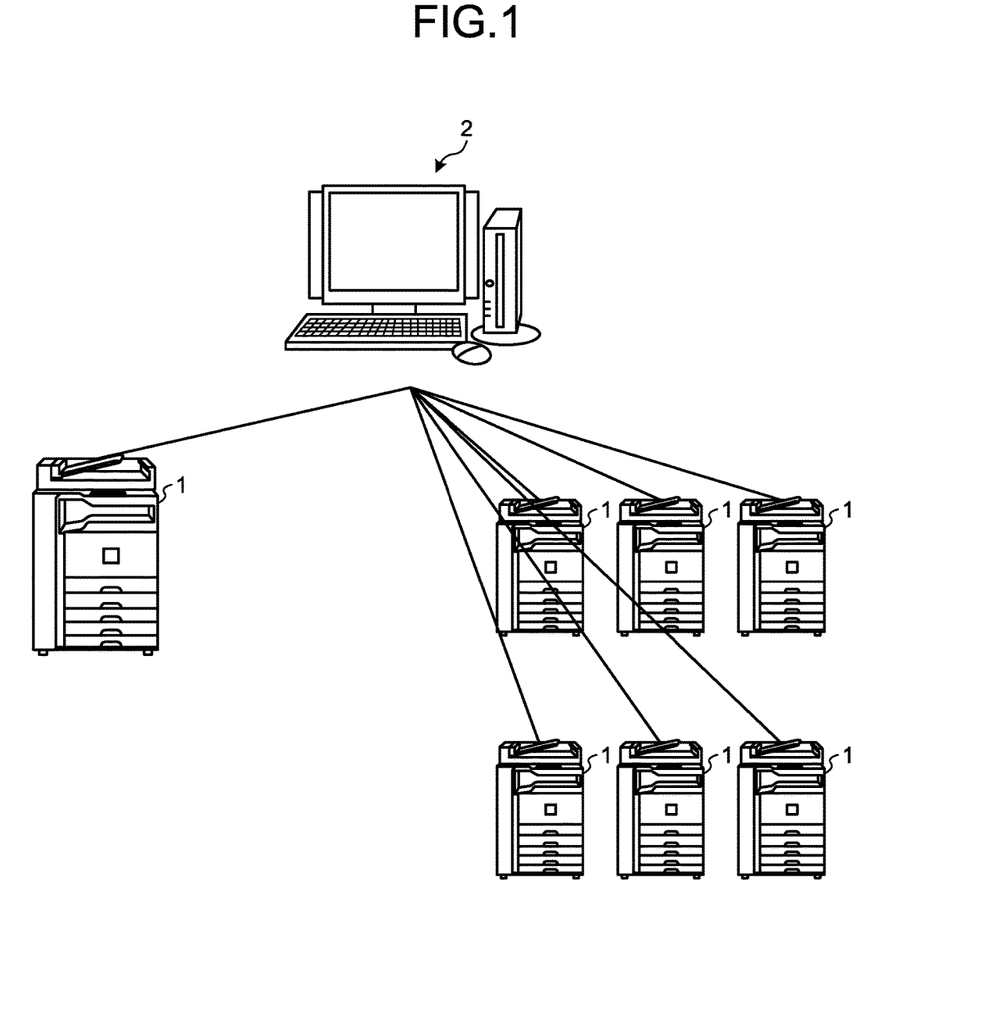
FIG. 1 is a system configuration diagram of an information processing system according to an embodiment.

FIG. 1 is a system configuration diagram of an information processing system according to an embodiment. As illustrated in FIG. 1, the information processing system includes a plurality of multifunction peripherals (MFPs) 1 (or may include a single MFP) and a single personal computer device (PC) 2 (or may include a plurality of PCs). The MFPs 1 and the PC 2 are connected to each other via a network such as the Internet.

Figure 2:
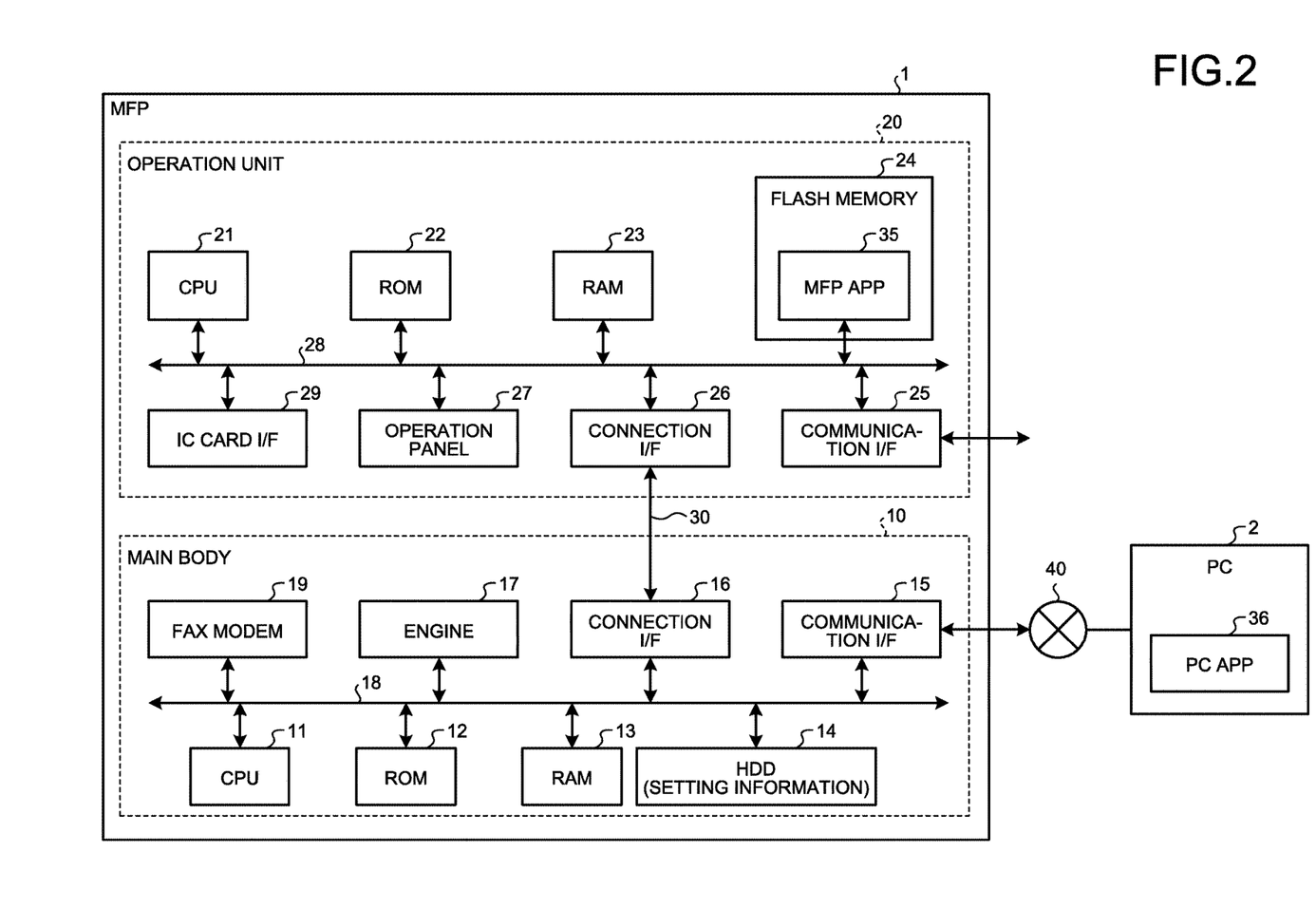
FIG. 2 is a hardware configuration diagram of an MFP.

FIG. 2 is a hardware configuration diagram of the MFP 1. The MFP 1 includes a main body 10 provided with various functions such as a copy function, a scanner function, a facsimile function, and a printer function; and an operation unit 20 that receives an input according to a user operation.

The main body 10 and the operation unit 20 are communicably connected to each other via a dedicated communication channel 30. The communication channel 30 can use one based on Universal Serial Bus (USB) standard, but may use one based on an arbitrary standard regardless of whether it is wired or wireless. The main body 10 may include a single or a plurality of functions of image forming functions such as the copy function, the scanner function, the facsimile function, and the printer function.

As the operation unit 20, it is possible to use an electronic device that can execute information processing completed on its own. As an example, any information processing terminal such as a smartphone or a tablet terminal can be used as the operation unit 20. In this case, the information processing terminal used as the operation unit 20 functions as an operation unit of the MFP 1.

More specifically, the information processing terminal used as the operation unit 20 is detachably connected to the MFP 1 instead of a conventional operation panel that is fixedly provided as an operation unit dedicated to the MFP 1. In other words, the information processing terminal used as the operation unit 20 is detachably (separably) but integrally provided with the MFP 1 at a predetermined position such as a position where the operation panel of the MFP 1 is provided. Therefore, the information processing terminal and the MFP 1 used as the operation unit 20 may be recognized as a single device. When detached from the MFP 1, the information processing terminal as the operation unit 20 functions as an operation unit of the MFP 1 by performing wireless communication such as Bluetooth (registered trademark) or infrared communication with the MFP 1.

The main body 10 performs an operation according to an input received by the operation unit 20. The main body 10 is communicable with an external device such as a client personal computer (PC) and also performs an operation according to an instruction received from the external device.

Hardware Configuration of Main Body

A hardware configuration of the main body 10 will be explained next. As illustrated in FIG. 2, the main body 10 includes a central processing unit (CPU) 11, a read-only memory (ROM) 12, a random access memory (RAM) 13, and hard disk drive (HDD) 14. The main body 10 also includes a communication interface (I/F) 15, a connection I/F 16, an engine 17, and a facsimile modem (FAX modem) 19. The units 11 to 17 and the FAX modem 19 are connected to each other via a system bus 18.

The CPU 11 integrally controls the operation of the main body 10. The CPU 11 controls the entire operation of the main body 10 by executing the program stored in the ROM 12 or the HDD 14 or so using the RAM 13 as a work area, and implements the various functions such as the copy function, the scanner function, the facsimile function, and the printer function.

The HDD 14 is an example of a setting storage unit, in which setting information of the MFP 1 is stored. The setting information can be changed or corrected by the PC 2. The concept of the setting information includes icon images and the like such as an application and a home screen in addition to a set value of a predetermined function.

The communication I/F 15 is an interface for establishing a communication connection with the PC 2 via a network 40. The connection I/F 16 is an interface for communicating with the operation unit 20 via the communication channel 30. As illustrated in FIG. 2, the communication channel 30 is represented as a wired connection, however, as explained above, the operation unit 20 can be attached to or detached from the main body 10 of the MFP 1. Therefore, when the operation unit 20 is attached to the MFP 1, the communication channel 30 functions as a wired communication channel, and when the operation unit 20 is detached from the MFP 1, the communication channel 30 functions as a wireless communication channel.

The engine 17 is hardware that performs processing other than general-purpose information processing and communication in order to implement the copy function, the scanner function, the facsimile function, and the printer function, etc. The engine 17 includes, for example, a scanner for scanning and reading an image of a document, a plotter for performing printing on a sheet material such as paper, and a facsimile communication unit for performing communication by facsimile. Moreover, the engine 17 may include a specific option such as a finisher for sorting a printed sheet material and an automatic document feeder (ADF) for automatically feeding a document.

Hardware Configuration of Operation Unit

A hardware configuration of the operation unit 20 will be explained next. As illustrated in FIG. 2, the operation unit 20 includes a CPU 21, a ROM 22, a RAM 23, a flash memory 24, a communication I/F 25, a connection I/F 26, an operation panel 27, and an IC card I/F 29, which are connected to each other via a system bus 28.

The CPU 21 integrally controls the operation of the operation unit 20. The CPU 21 controls the entire operation of the operation unit 20 by executing the program stored in the ROM 22 or so using the RAM 23 as a work area. The communication I/F 25 is an interface for communicating with, for example, a server device on the network 40. The connection I/F 26 is an interface for communicating with the main body 10 via the communication channel 30.

The IC card I/F 29 is connected to a card reader via, for example, an Universal Serial Bus (USB) cable. The card reader performs non-contact wireless communication with an IC card closely operated (non-contact operation) by the user at the time of a login operation to the MFP 1, and reads authentication information such as a card ID and user information stored in the IC card. The authentication information may be read from the IC card through any contact operation other than the non-contact operation. The operation unit 20 may have a built-in card reader. In other words, the operation unit 20 and the card reader may be integrally formed (may be formed as a single device).

The flash memory 24 stores an MFP application (app) 35 which is a setting change application program installed by the PC 2. In this example, the MFP app 35 is stored in the flash memory 24 but may be stored in any other storage such as the ROM 22 or the RAM 23. The MFP app 35 includes, as an example, a function for automatically notifying a specified user of counter information and a function for displaying counter information on the operation panel 27 (an example of the display unit) of the MFP 1 through a user operation. When the counter information is to be automatically informed, various pieces of setting information are respectively set, such as a destination, a transmission time, transmission timing, and a setting as to whether to retry upon transmission failure. Specifically, as a destination, for example, a mail address of an e-mail or a uniform resource locator (URL) is set along with a subject. As transmission timing, for example, transmission time such as date, week, and month is set. The CPU 21 operates according to the MFP app 35 to thereby change the setting information stored in the HDD 14 to a set value specified by the user (change information).

The operation panel 27 includes a liquid crystal display (LCD) provided with a touch sensor. The operation panel 27 receives various inputs respectively corresponding to user operations and displays various pieces of information such as information corresponding to the received input, information indicating an operation status of the MFP 1, and information indicating a setting state. The operation panel 27 may include an organic electro-luminescence (OEL) display having a touch sensor. Moreover, in addition to or instead of the OEL display, an operation part such as a hardware key or a display unit such as a light emitting unit may be provided.

In the example of the embodiment, an operating system (OS) of the main body 10 and an OS of the operation unit 20 are different from each other in order to maintain independency of the functions. In other words, the main body 10 and the operation unit 20 operate independently from each other in separate operating systems. For example, it is also possible to use Linux (registered trademark) as the OS of the main body 10 and to use Android (registered trademark) as the OS of the operation unit 20.

By operating the main body 10 and the operation unit 20 in the separate operating systems, the communication between the main body 10 and the operation unit 20 is performed as communication between different devices but not communication between processes in shared devices. An operation (command communication) of transmitting an input (contents instructed from the user) received by the operation unit 20 and an operation that the main body 10 notifies the operation unit 20 of an event correspond to the above operation. Herein, the operation unit 20 can use the function of the main body 10 by performing the command communication to the main body 10. Examples of the event to be notified to the operation unit 20 from the main body 10 include, but are not limited to, an execution status of the operation in the main body 10 and contents set in the main body 10.

In the example of the embodiment, because power is supplied to the operation unit 20 via the communication channel 30 from the main body 10, the power supply control to the operation unit 20 can be performed separately (independently) from the power supply control to the main body 10.

In this example, the main body 10 and the operation unit 20 are electrically and physically connected to each other via the communication channel 30, however, as explained above, the operation unit 20 can be removed from the main body 10. In this case, a short-range wireless communication unit, such as an infrared communication unit, an RF communication unit, and a Bluetooth (registered trademark) communication unit, is provided in the main body 10 and the operation unit 20. RF is short for "Radio Frequency". Alternatively, a wireless LAN communication function such as Wi-Fi (registered trademark) is provided in the main body 10 and the operation unit 20, so that both devices may be communicable with each other via a wireless LAN access point (wireless LAN AP) 41 and the network 40. LAN is short for "Local Area Network". When the operation unit 20 is removed from the main body 10, the operation unit 20 stores the power supplied from the main body 10 via the communication channel 30 in a rechargeable battery, and when removed from the main body 10, the operation unit 20 operates on the power stored in the rechargeable battery to perform communication with the main body 10.

Figure 3:
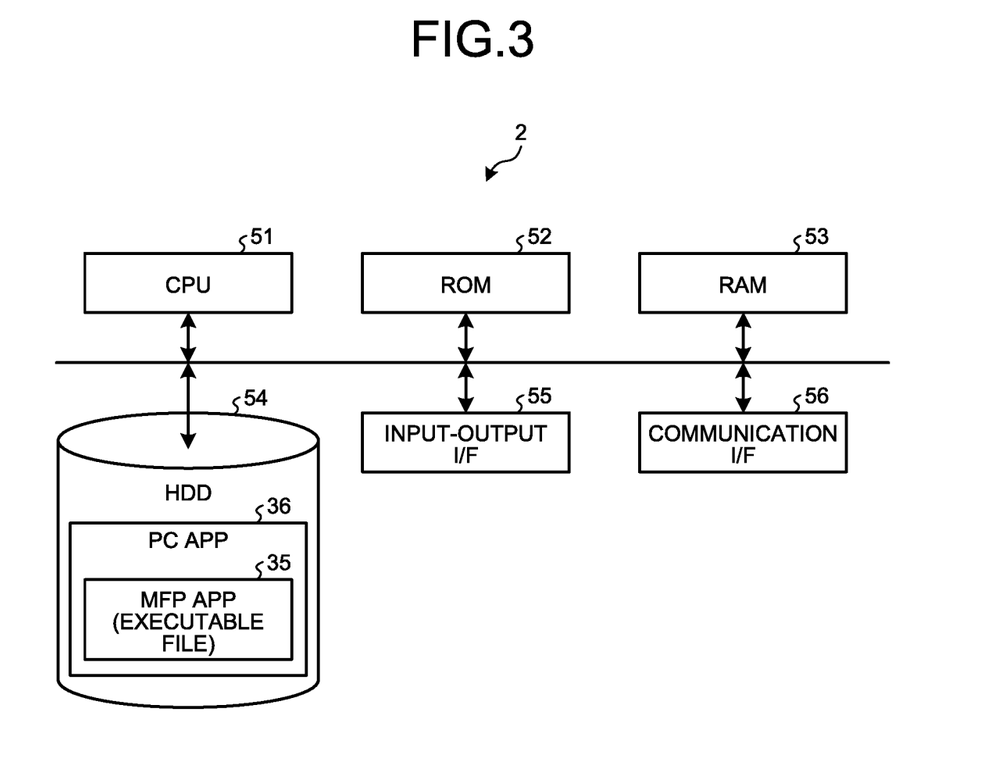
FIG. 3 is a hardware configuration diagram of a personal computer device.

A hardware configuration diagram of the PC 2 is represented in FIG. 3. As illustrated in FIG. 3, the PC 2 includes a CPU 51, a ROM 52, a RAM 53, a HDD 54, an input-output I/F 55, and a communication I/F 56. The HDD 54 is an example of a storage unit, in which a PC app 36 for changing the settings of the MFP 1 or the like is stored. The PC app 36 includes an executable file of the MFP app 35, as a file, to be installed in the MFP 1. The CPU 51 operates based on the PC app 36, to thereby acquire the executable file from the MFP 1, change the displayed setting information, and reflect the changed setting information in the MFP 1.

Figure 4:
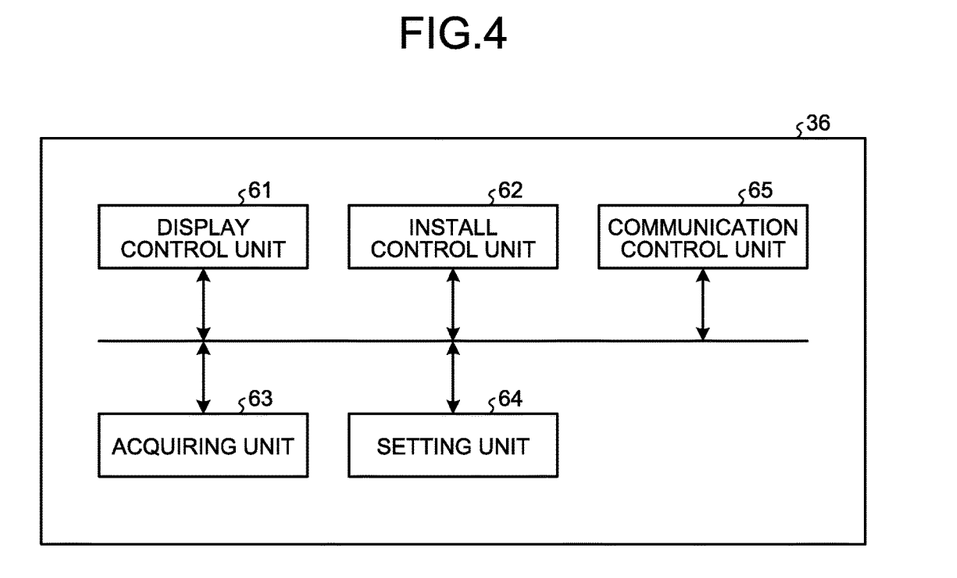
FIG. 4 is a functional block diagram of a PC app.

A functional block diagram of functions implemented by the CPU 51 executing the PC app 36 is represented in FIG. 4. As illustrated in FIG. 4, by executing the PC app 36, the CPU 51 implements functions of a display control unit 61 (an example of a changing unit), an install control unit 62, an acquiring unit 63, a setting unit 64, and a communication control unit 65 in software. In this example, the display control unit 61 to the communication control unit 65 are implemented in software, however, part of or whole of the display control unit 61 to the communication control unit 65 may be implemented by hardware such as an integrated circuit (IC).

The CPU 11, the CPU 21, and the CPU 51 explained in the present specification include a processor programmed so as to execute the functions in the software, and hardware such as an application specific integrated circuit (ASIC) designed to execute the functions, an integrated circuit (IC), or a circuit module.

The PC app 36 may be provided by being recorded in a computer-readable recording medium such as a compact disk read only memory (CD-ROM) and a flexible disk (FD) in an installable or executable file format. It may also be provided by being recorded in a computer-readable recording medium such as compact disk-recordable (CD-R), a digital versatile disk (DVD), a Blu-ray Disc®, and a semiconductor memory. The PC app 36 may be provided by being installed via a network such as the Internet. The PC app 36 may be provided by being preinstalled in a ROM or the like in the device.

The display control unit 61 displays the setting information acquired from the MFP 1 on a display unit such as a monitor device. The install control unit 62 installs the executable file of the MFP app 35 provided as a file in the PC app 36 into the MFP 1. The acquiring unit 63 acquires the setting information from the MFP 1. the setting unit 64 changes the setting information, or the like. The communication control unit 65 performs communication control of the setting information acquired from the MFP 1, communication control of the changed setting information reflected in the MFP 1, and the like.

Figure 5:
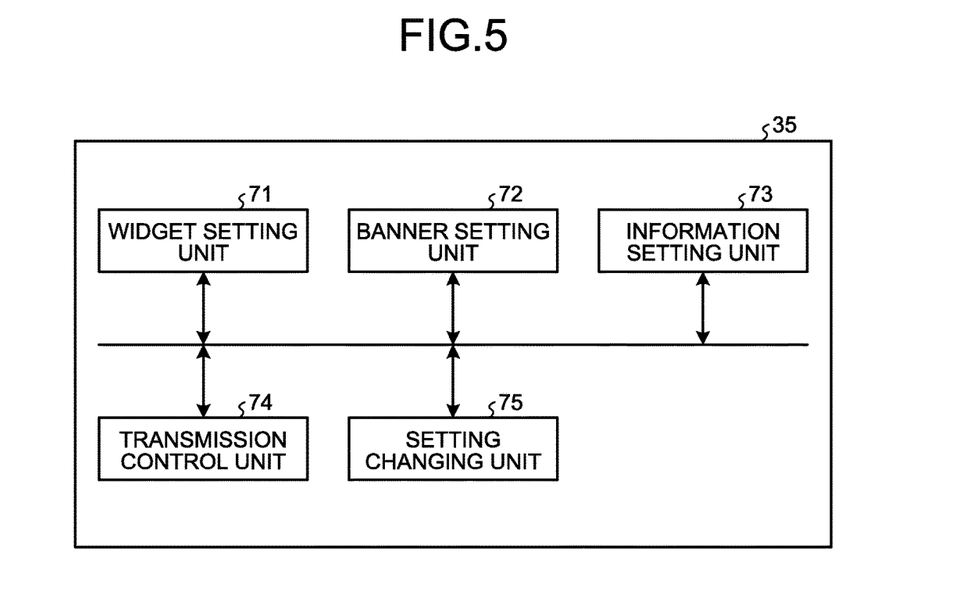
FIG. 5 is a functional block diagram of an MFP app.

FIG. 5 is a functional block diagram of functions implemented by the CPU 21 executing the MFP app 35 installed in the operation unit 20 of the MFP 1 by the PC 2. As illustrated in FIG. 5, the CPU 21 functions as a widget setting unit 71, a banner setting unit 72, an information setting unit 73, a transmission control unit 74, and a setting changing unit 75 by executing the MFP app 35. Part of or whole of the widget setting unit 71 to the setting changing unit 75 may be implemented by hardware such as an IC. The setting changing unit 75 is an example of a change information acquiring unit. The widget setting unit 71, the banner setting unit 72, the information setting unit 73, and the setting changing unit 75 are examples of a setting changing unit.

The MFP app 35 may be provided by being recorded in a computer-readable recording medium such as a CD-ROM and an FD in an installable or executable file format. It may also be provided by being recorded in a computer-readable recording medium such as CD-R, a DVD, a Blu-ray Disc®, and a semiconductor memory. The MFP app 35 may be provided by being installed via a network such as the Internet. The MFP app 35 may be provided by being preinstalled in the ROM or the like in the device.

The widget setting unit 71 controls to write the setting information for displaying a message on a widget displayed on the operation panel 27 onto the HDD 14 or to read it therefrom. The banner setting unit 72 controls to write the setting information for displaying a message as a banner on the operation panel 27 onto the HDD 14 or to read it therefrom. The information setting unit 73 controls to write the setting information for displaying a message (dealer information) received from the administrator of the MFP 1 on the operation panel 27 onto the HDD 14 or to read it therefrom.

The transmission control unit 74 controls the communication I/F 15 so as to transmit the setting information to the PC 2. The setting changing unit 75 performs processing of rewriting the setting information stored in the HDD 14 to setting information changed by the PC 2, or the like.

In the information processing system according to the embodiment, the PC app 36 of the PC 2 installs the MFP app 35 into the MFP 1. The MFP app 35 installed in the MFP 1 transmits the setting information of the MFP 1 to the PC 2 according to a request from the PC app 36. The PC app 36 changes the setting information acquired from the MFP 1 to send it back to the MFP 1. The MFP app 35 controls to store the setting information (changed setting information) sent back by the PC app 36 in the HDD 14 of the main body 10, and reflects the setting information in the MFP 1.

Figure 6:
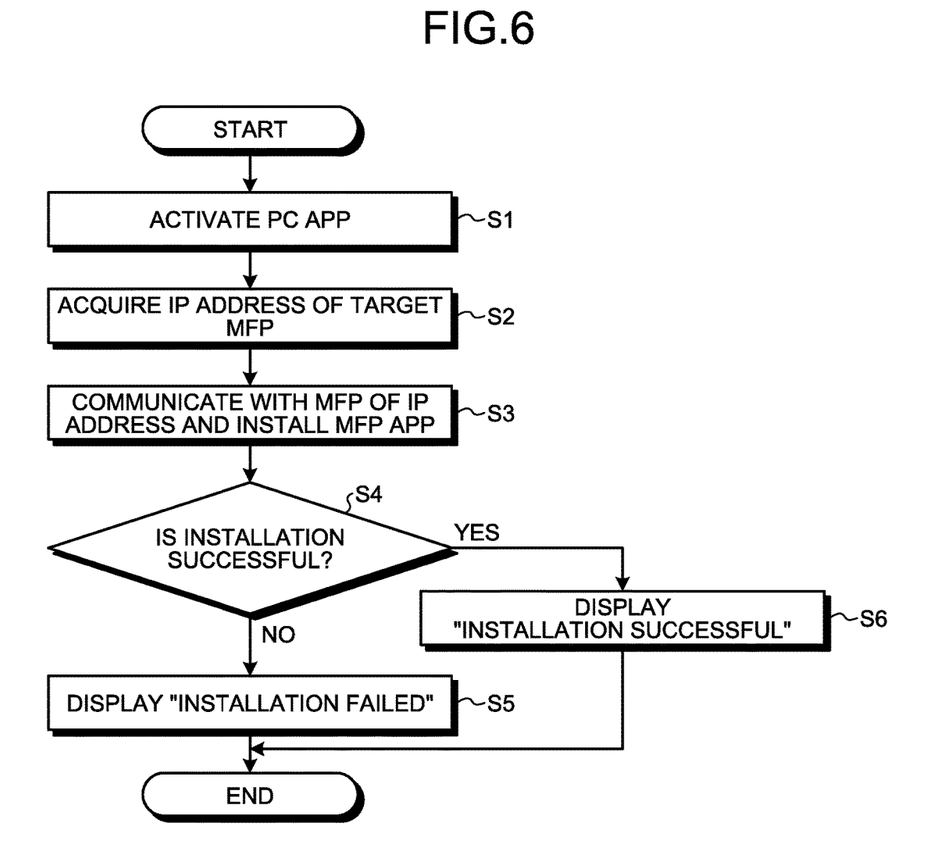
FIG. 6 is a flowchart illustrating a flow for installing an executable file of the MFP app owned by the PC app as an own file into the MFP.

FIG. 6 is a flowchart illustrating a flow for installing an executable file of the MFP app 35 owned by the PC app 36 as an own file into the MFP 1. When the setting information of the MFP 1 is to be changed, the user activates the PC app 36 of the PC 2. At Step S1, the CPU 51 of the PC 2 reads the PC app 36 from the HDD 54 and activates it.

When the PC app 36 is activated, the user inputs an Internet Protocol (IP) address of the MFP 1 into which the MFP app 35 is installed. At Step S2 in the flowchart of FIG. 6, the acquiring unit 63 of the PC app 36 illustrated in FIG. 4 acquires the IP address input by the user. At Step S3, the install control unit 62 installs the MFP app 35 stored in the HDD 54 into the MFP 1 corresponding to the IP address. The communication control unit 65 controls the communication corresponding to the install operation of the MFP app 35 via the communication I/F 56. In this example, the operation of installing the MFP app 35 into a single MFP 1 is explained, however, the MFP app 35 may be collectively installed into a plurality of MFPs 1.

The setting changing unit 75 of the MFP 1 illustrated in FIG. 5 transmits a replay indicating "Installation successful" to the PC 2 when the installation of the MFP app 35 is successful, and transmits a replay indicating "Installation failed" to the PC 2 when the installation of the MFP app 35 is failed. At Step S4, the acquiring unit 63 of the PC 2 determines whether the replay indicating "Installation successful" has been received from the MFP 1.

When the acquiring unit 63 of the PC 2 determines that the replay indicating "Installation successful" has been received from the MFP 1 (Yes at Step S4), then at Step S6, the install control unit 62 displays a message indicating "Installation successful" on a monitor device connected to the PC 2. On the other hand, when the acquiring unit 63 of the PC 2 determines that the replay indicating "Installation failed" has been received from the MFP 1 (No at Step S4), then at Step S5, the install control unit 62 displays a message indicating "Installation failed" on the monitor device connected to the PC 2. When the installation of the MFP app 35 is failed, the user tries the installation of the MFP app 35 again.

If installer software for installing the MFP app 35 into the MFP 1 from the PC 2 is provided separately from an application on the PC 2 that cooperates with the MFP app 35 after the installation, it takes time and effort to respectively manage the applications. In addition, if a version of the MFP app 35 of the MFP 1 does not match a version of the PC app 36 on the PC 2 that cooperates therewith, some troubles might occur in the operation.

However, in the case of the information processing system according to the embodiment, the executable file of the MFP app 35 owned by the PC app 36 as the own file is installed in the MFP 1. Therefore, it is possible to collectively manage the MFP app 35 and the PC app 36. It is also possible to prevent any trouble from occurring in the operation due to the mismatch between the versions of the MFP app 35 and the PC app 36.

Figure 7:
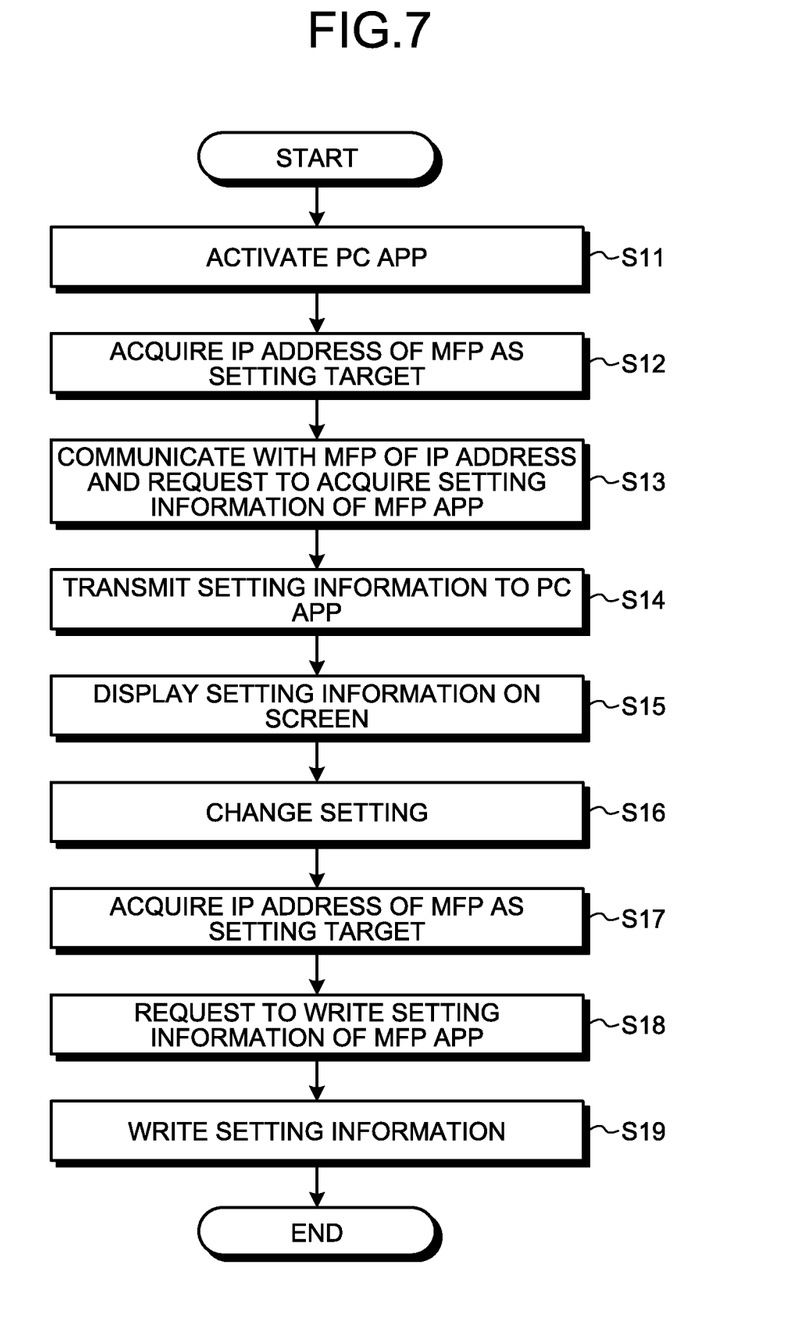
FIG. 7 is a flowchart illustrating a flow of a setting change operation of the MFP.

Thus, when the MFP app 35 is installed in the MFP 1, the user can change the setting of the MFP 1 to desired setting through the PC 2. A flow of a setting change operation of the MFP 1 is represented in the flowchart of FIG. 7. When the setting of the MFP 1 is to be changed, the user activates the PC app 36 through the PC 2. When detecting an activation operation of the PC app 36, then at Step S11, the CPU 51 of the PC 2 activates the PC app 36 from the HDD 54.

Subsequently, the user inputs the IP address of the MFP 1 that changes the setting. At Step S12, the acquiring unit 63 of the PC app 36 acquires the IP address input by the user. At Step S13, the acquiring unit 63 requests the MFP 1 corresponding to the acquired IP address to acquire the setting information. The communication control unit 65 controls the communication between the PC 2 and the MFP 1.

Subsequently, at Step S14, the setting changing unit 75 illustrated in FIG. 5 acquires the setting information of the MFP 1 stored in the HDD 14. The transmission control unit 74 then transmits the acquired setting information to the PC 2. The display control unit 61 of the PC 2 illustrated in FIG. 4 displays a setting screen of each setting of the MFP 1 on the display unit such as the monitor device (Step S15). The user operates an operation part such as a keyboard device or a mouse device to change desired setting information. The display control unit 61 as an example of the changing unit changes the setting information displayed on the monitor device according to the user's change operation and displays the changed setting information thereon (Step S16).

Subsequently, the user inputs the IP address of the MFP 1 in which the changed setting information is reflected. At Step S17, the acquiring unit 63 acquires the IP address of the MFP 1 input by the user. The user may input (specify) an IP address or IP addresses of a plurality of MFPs 1. At Step S18, the setting unit 64 requests the MFP 1 corresponding to the IP address input by the user to write the changed setting information. The communication control unit 65 controls the communication between the MFP 1 corresponding to the request to write the changed setting information and the PC 2.

Lastly, at Step S19, the widget setting unit 71 to the information setting unit 73 and the setting changing unit 75 illustrated in FIG. 5 overwrite original setting information with the setting information changed by the user, in the HDD 14 of the MFP 1, and the processing of the flowchart in FIG. 7 is ended. Thus, the settings of an MFP 1 or MFPs 1 can be collectively changed through the PC 2.

The banner setting unit 72 performs message setting and setting of display timing of a banner according to the setting information changed by the user. The possible message setting includes a direct input setting in which the user performs a text input operation of a desired message and a URL input setting for inputting a uniform resource locator (URL) of a WEB page in which a user's desired message is described. Moreover, the interval setting is possible so that an interval for acquiring messages is set to a desired interval. The display timing of a banner can be set by selecting one from among timings of, for example, the start of copying, the reduction of toner, the reduction in quantity of paper, and turning on the power, or desired time.

The banner setting unit 72 of the MFP 1 displays the message directly input by the user in the banner. When a URL is specified by the user, the banner setting unit 72 accesses the WEB page of the URL, and acquires the message on the server device and displays the acquired message on the operation panel 27. In this case, the message to be displayed can be managed by the server device on the network.

The widget setting unit 71 additionally sets the message to the widget according to the setting information changed by the user. The possible message setting includes the direct input setting in which the user performs a text input operation of a desired message to set a desired image and the URL input setting for inputting the URL of the WEB page to which a user's desired message or image is uploaded. Moreover, the interval setting is possible so that an interval for acquiring messages is set to a desired interval. The display timing of a message can be set by selecting one from among timings of, for example, the start of copying, the reduction of toner, the reduction in quantity of paper, and turning on the power, or desired time.

The widget setting unit 71 of the MFP 1 displays the message and (or) the image directly input by the user on the widget. When a URL is specified by the user, the widget setting unit 71 accesses the WEB page of the URL to acquire the message or the image on the server device and displays the acquired message or image on the operation panel 27. In this case, the message to be displayed can be managed by the server device on the network.

The information setting unit 73 additionally sets the message of an administrator (dealer) of the MFP 1 according to the setting information changed by the user. The possible message setting includes the direct input setting in which the user performs a text input operation of a desired message and the URL input setting for inputting the URL of the WEB page to which a user's desired message is uploaded. Moreover, the interval setting is possible so that the interval for acquiring messages is set to a desired interval. When detecting an operation of contacting an icon to specify the display of a dealer message displayed on the operation panel 27, the information setting unit 73 displays the dealer message previously set as explained above on the operation panel 27. When the URL is specified by the user, the information setting unit 73 accesses the WEB page of the URL to acquire the dealer message on the server device and displays the acquired dealer message on the operation panel 27. In this case, the dealer message to be displayed can be managed by the server device on the network.

When notification of the counter information (an example of counter information indicating the number of operations of the device) for the printing of the MFP 1 is set, the transmission control unit 74 composes an e-mail or the like in which the counter information is described in the body or to which the counter information is attached as attached information with a specified subject for the destination such as the mail address of the e-mail or the URL indicated by the setting information (or change information). The transmission control unit 74 transmits the e-mail at a specified transmission time. When the transmission is failed, the transmission control unit 74 transmits it so as to try again the e-mail or so at predetermined transmission intervals if execution of retry is set (transmission retry is set).

As apparent from the above explanation, the information processing system according to the embodiment is configured to change the setting information acquired from the MFP 1 in the PC app 36 of the PC 2. The changed setting information is transmitted to one or more MFPs 1. Thus, the user can change the setting of the MFP 1 from a remote place without moving up to the installation place of the MFP 1 and operating it. Therefore, the operation time required for changing the settings of the MFP 1 can be more shortened. Moreover, by collectively transmitting the changed setting information to the MFPs 1 from the PC 2, the settings of the MFPs 1 can be collectively changed. Therefore, it is possible to more effectively change the settings of the MFPs 1.

In addition, the executable file of the MFP app 35 owned by the PC app 36 as the own file is installed in the MFP 1. Therefore, it is possible to collectively manage the MFP app 35 and the PC app 36. It is also possible to prevent any trouble from occurring in the operation due to the mismatch between the versions of the MFP app 35 and the PC app 36.

For example, in the explanation according to the embodiment, the present invention is applied to the MFP 1 capable of attaching and detaching the operation unit 20 to and from the main body 10, however, the same effects as above can be obtained even in any device such as MFP in which the operation unit is fixed to the main body.

Figure 8:
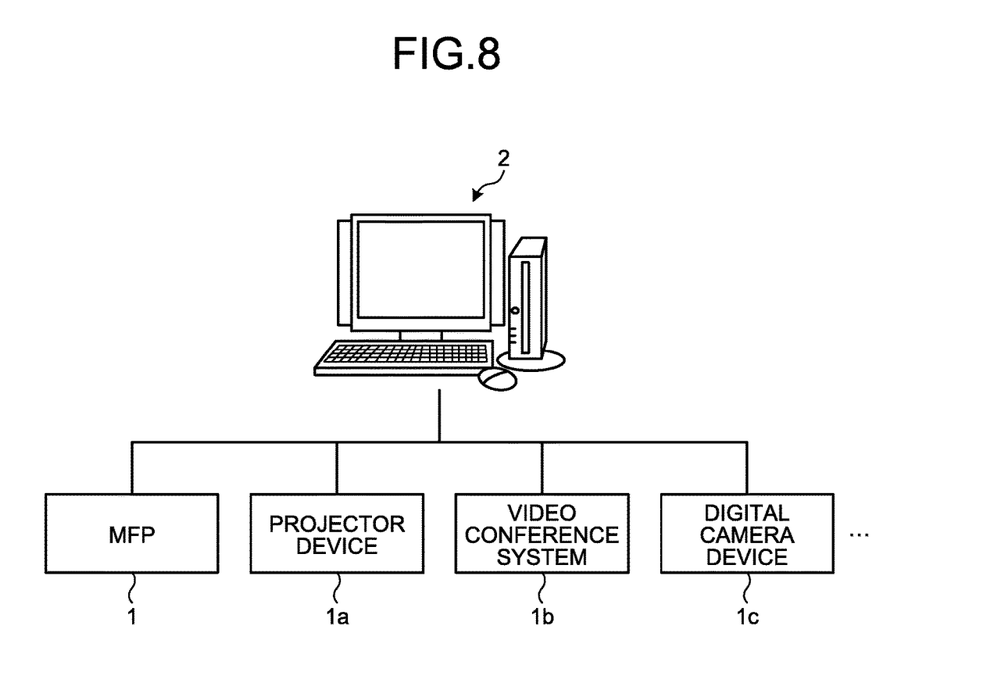
FIG. 8 is another aspect of the system configuration diagram of the information processing system.

The MFP 1 according to the embodiment is an example of the device to which the present invention is applied. Therefore, the present invention may be applied to any device such as a projector device, a video conference system, or a digital camera device other than the MFP 1 if the device performs user authentication. FIG. 8 is another aspect of the system configuration diagram of the information processing system as shown in FIG. 1. As illustrated in FIG. 8, the information processing system includes the multifunction peripheral (MFP) 1, a projector device 1a, a video conference system 1b, and a digital camera device 1c, etc, and the single personal computer device (PC) 2 (or may include a plurality of PCs). The MFP 1, the projector device 1a, the video conference system 1b, and the digital camera device 1c, etc are respectively connected to the PC 2 via a network such as the Internet.

In the embodiment, the executable file, the application file, and the like have been explained. However, the file is only an example, and therefore the embodiment is not limited to the file format and includes various data formats if it is a format that can be processed (implemented) in the present embodiment.

The CPU 11, the CPU 21, and the CPU 51 explained in the present specification include a processor programmed so that software executes the functions and hardware such as an ASIC designed to execute the functions, an IC, or a circuit module.

It should be noted that a person skilled in the field of information processing technology may employ the present invention using application specific integrated circuits (ASIC) or an apparatus in which circuit modules are connected.

Further, each of functions (units) may be implemented by one or more circuits.

It should be noted that, in the specification, the circuit may include a processor programmed by software to execute the corresponding functions and hardware which is designed to execute the corresponding functions such as the ACIC and the circuit module.

According to the present embodiments, the settings can be more effectively changed.

Patent Literature 1: Japanese Unexamined Patent Application Publication No. 2014-229169

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system comprising:
   one or more devices configured to operate based on setting information for controlling an operation; and
   at least one external device configured to change the setting information of the one or more devices, wherein the external device includes circuitry configured to:
   acquire one or more addresses of the devices,
   acquire the setting information of the devices,
   revise the setting information internally at the external device;
   transmit the revised setting information from the external device to the addresses of the devices;
   the devices include circuitry configured to:
   acquire the setting information from a setting storage and transmit the acquired setting information to the external device,
   acquire the revised setting information from the external device, and
   reflect the revised setting information internally by replacing the original setting information stored in the setting storage with the revised setting information.

2. The information processing system according to claim 1, wherein the circuitry is further configured to:
   include a storage configured to store an application that acquires at least the setting information from the devices and writes the change information to the devices and,
   install the application into the devices.

3. The information processing system according to claim 2, wherein
   the circuitry of the external device is configured to install an executable file of the application in an application file of the external device into the devices.

4. The information processing system according to claim 1, wherein
   a program performed by a processor in the circuitry of the devices is configured to be installed as an application into the devices from the external device.

5. The information processing system according to claim 4, wherein
   the program is executable files in a file of the application in the external device.

6. The information processing system according to claim 1, wherein
   the setting information is configured to include, when there is a user operation, either one of setting information for setting so as to display counter information indicating number of operations of the devices on a display and setting information for setting so as to transmit the counter information to a predetermined destination, and
   the circuitry of the devices is configured to transmit the counter information to the predetermined destination according to the setting information for setting of the transmission or change information of the setting information for setting of the transmission.

7. The information processing system according to claim 6, wherein, when a transmission retry of the counter information is set and a transmission interval is set, the circuitry of the devices is configured to transmit again, when the transmission of the counter information is failed, the counter information at the transmission interval.

8. A computer program product for being executed on computer comprising instructions for:
    acquiring, at an external device, addresses of one or more devices, wherein each of the devices includes setting information for controlling an operation from a setting storage;
    acquiring, at the external device, the setting information of the devices;
    revising the setting information internally at the external device;
    transmitting the revised setting information from the external device to the addresses of the devices; and
    reflecting the revised setting information internally at the devices by replacing original setting information stored in the setting storage with the revised setting information.

9. The computer program product according to claim 8, wherein
    the computer program product is configured to be installed as an application into a device from the external device.

10. The computer program product according to claim 9, wherein
    the computer program product is executable files in a file of the application in the external device.

11. The computer program product according to claim 8, wherein
    the setting information is configured to include, when there is a user operation, either one of setting information for setting so as to display counter information indicating number of operations of a device on a display and setting information for setting so as to transmit the counter information to a predetermined destination, and
    the transmitting includes transmitting the counter information to the predetermined destination according to the setting information for setting of the transmission or change information of the setting information for setting of the transmission.

12. The computer program product according to claim 11, wherein, when a transmission retry of the counter information is set and a transmission interval is set,
    the transmitting includes transmitting again, when the transmission of the counter information is failed, the counter information at the transmission interval.

13. An information processing method that an information system executes, the information processing system including one or more devices configured to operate based on setting information for controlling an operation and at least one external device configured to change the setting information of the devices, the information processing method comprising:
    a step of acquiring, at an external device, addresses of one or more devices, wherein each of the devices includes setting information for controlling an operation from a setting storage;
    an acquisition step of acquiring the setting information for each of the devices;
    a step of revising the setting information internally at the external device;
    a step of transmitting the revised setting information from the external device to the addresses of the devices;
    an acquisition step of acquiring, at the devices, the revised setting information the from the external device; and
    a step of reflecting the revised setting information internally at the devices by replacing original setting information stored in the setting storage with the revised setting information.

14. The information processing method according to claim 13, further comprising:
    a store step of storing, in a storage, an application that acquires at least the setting information from the one or more devices and writes the change information to the devices and,
    an installation step of installing the application into the devices.

15. The information processing method according to claim 14, wherein
    the installation step includes installing an executable file of the application in an application file of the external device into the devices.

16. The information processing method according to claim 13, wherein
    a program performed by a processor in the devices is configured to be installed as an application into the devices from the external device.

17. The information processing method according to claim 16, wherein
    the program is executable files in a file of the application in the external device.

18. The information processing method according to claim 13, wherein
    the setting information is configured to include, when there is a user operation, either one of setting information for setting so as to display counter information indicating number of operations of the devices on a display and setting information for setting so as to transmit the counter information to a predetermined destination, and
    the transmitting the acquired setting information includes transmitting the counter information to the predetermined destination according to the setting information for setting of the transmission or change information of the setting information for setting of the transmission.

19. The information processing method according to claim 18, wherein, when a transmission retry of the counter information is set and a transmission interval is set,
    the transmitting the acquired setting information includes transmitting again, when the transmission of the counter information is failed, the counter information at the transmission interval.

* * * * *